(12) United States Patent
Borza

(10) Patent No.: US 6,700,606 B1
(45) Date of Patent: Mar. 2, 2004

(54) MICROMIRROR OPTICAL IMAGER

(75) Inventor: Stephen J. Borza, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 0 days.

(21) Appl. No.: 09/328,345

(22) Filed: Jun. 9, 1999

(51) Int. Cl.$^7$ .............. H04N 5/225; G06K 9/00
(52) U.S. Cl. ............ 348/218.1; 348/340; 382/124
(58) Field of Search ............... 348/218.1, 344, 348/335, 340; 382/124, 126, 127, 125; 359/223, 224, 212, 95

(56) References Cited

U.S. PATENT DOCUMENTS

| | | | |
|---|---|---|---|
| 5,109,427 A | * | 4/1992 | Yang |
| 5,187,482 A | * | 2/1993 | Tiemann et al. ............ 341/143 |
| 5,187,748 A | * | 2/1993 | Lee ............... 382/127 |
| 5,212,555 A | * | 5/1993 | Stoltz ............ 348/203 |
| 5,233,404 A | * | 8/1993 | Lougheed et al. ............ 356/71 |
| 5,327,286 A | * | 7/1994 | Sampsell et al. ............ 359/561 |
| 5,535,047 A | * | 7/1996 | Hornbeck ............ 359/295 |
| 5,646,683 A | * | 7/1997 | Motta ............ 348/203 |
| 5,920,384 A | * | 7/1999 | Borza ............ 356/71 |
| 5,923,036 A | | 7/1999 | Tague, Jr. et al. |
| 6,007,208 A | | 12/1999 | Dickensheets et al. |
| 6,025,912 A | | 2/2000 | Prikryl et al. |
| 6,025,951 A | | 2/2000 | Swart et al. |
| 6,028,696 A | | 2/2000 | Robinson et al. |
| 6,037,922 A | | 3/2000 | Yagyu |
| 6,038,058 A | | 3/2000 | Robinson et al. |
| 6,069,352 A | * | 5/2000 | Castracane et al. ... 250/214 VT |
| 6,341,028 B1 | * | 1/2002 | Bahuguna et al. .......... 359/211 |
| 6,399,935 B1 | * | 6/2002 | Jovin et al. ............ 250/216 |

* cited by examiner

Primary Examiner—Vu Le
Assistant Examiner—Justin Misleh
(74) Attorney, Agent, or Firm—Freedman & Associates

(57) ABSTRACT

An optical imaging device such as a fingerprint imager is disclosed that has an array of micromirrors that allows sequential scanning of areas of a platen in steps. The scanned areas of the platen are transmitted to an image sensor and a composite image constructed from the scanned areas. By transmitting scanned areas of the platen in sections, the image sensor area required is reduced in contrast to prior art optical images that scan the whole platen in a single step.

17 Claims, 7 Drawing Sheets

MICROMIRROR OPTICAL IMAGER

FIELD OF THE INVENTION

This invention relates generally to image sensors, and more particularly to an integrated image sensor using micromirrors.

BACKGROUND OF THE INVENTION

Security is an increasing concern for governments, industry and individuals alike. The use of passwords has many associated problems. Passwords are changed on a regular basis inducing password fatigue. Password fatigue is evident in the choice of banal passwords, for example, names of children or dogs, dates of birth etc. Obviously, such simple passwords present a security risk. In addition, the use of computer algorithms for breaking passwords is an increasing problem.

In light of the problems associated with passwords, biometric sensing is becoming increasingly used. One important type of biometric sensing exploits the unique topography of an individual's skin to allow or deny access. The most commonly used skin for biometric sensing is on the fingertip. The fingerprint is widely accepted around the world as proof of identity. It is widely understood that fingerprints are unique to each individual and essentially impossible to lose. In contrast to digital signatures, fingerprints have proven legal standing. In fact, the fingerprint is used in situations where there can be no mistake, such as in criminal proceedings and high-security access. In comparison to other biometric methods, such as retinal scans, a fingerprint scan is non-intrusive.

In an optical fingerprint input transducer or sensor, the finger under investigation is usually pressed against a flat surface, a platen, such as a side of a glass plate, and the ridge and valley pattern of the finger tip is sensed by a sensing means such as an interrogating light beam. Various optical devices are known which employ prisms upon which a finger whose print is to be identified is placed. The prism has a first surface, the platen, upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this type are generally used to control the building-access or information-access of individuals to buildings, rooms, and devices such as computer terminals. However, in the prior art discussed above the light after interrogation of a surface must be "observed" by an image sensor, which is typically a charge coupled device (CCD) array. Generally, the most expensive component in an optical imager is the image sensor.

It has now been found that it is possible to reduce the image sensor area. By reducing image sensor area in an optical imager, it is now possible to reduce the component costs of the image sensor required for an optical imager. Conversely, it is also possible to retain current image sensor area and to significantly increase resolution of images captured therewith.

OBJECT OF THE INVENTION

Thus, in an attempt to overcome these and other limitations of prior art devices, it is an object of this invention to provide an efficient use of image sensor area.

SUMMARY OF THE INVENTION

Thus, in accordance with the present invention there is provided an optical imager comprising: a light source for emitting light; a platen for reflecting a portion of light emitted by the light source and incident thereon; an image sensor for sensing light incident thereon; and, a micromirror device operable from a first reflecting position to a second other reflecting position, the micromirror device for reflecting light reflected by the platen along a first optical path in a first reflecting position such that a first portion of light reflected from the platen is incident on the image sensor and for reflecting light reflected by the platen along a second optical path in a second reflecting position such that a second portion of light reflected from the platen is incident on the image sensor, wherein the first portion of light and the second portion of light are reflected from different positions of the platen.

In accordance with the invention there is further provided a method of capturing an image comprising the steps of: positioning an array of micromirrors in a first reflective position; acquiring a first image of light reflected from the array of micromirrors to form an image of a first area; positioning the micromirrors in a second other reflective position; acquiring a second image of light reflected from the array of micromirrors to form an image of a second area; and, combining the first image and the second image to form a composite image of an area larger than the first area and larger than the second area.

In accordance with another aspect of the invention there is provided a method of capturing an image comprising the steps of positioning an array of micromirrors in a first reflective position; acquiring a first image of light reflected from the array of micromirrors to form an image of a first area; moving the micromirrors to a second other reflective position; during motion of the micromirrors at intervals acquiring a plurality of images of light reflected from the array of micromirrors to form an image of a other areas; and, combining the first image and the plurality of images to form a composite image.

BRIEF DESCRIPTION OF THE DRAWINGS

Exemplary embodiments of the invention will now be described in conjunction with the following drawings, in which:

FIG. 2b is a magnified portion of the multi-prism of FIG. 2a;

In the following detailed description of the invention, the same reference numerals are used in different figures to designate similar components.

DETAILED DESCRIPTION OF THE INVENTION

It has now been found that by integrating a Digital Micromirror Device (DMD™) into an optical imager, it is possible to reduce the surface area of an image sensor. The Digital Micromirror Device is an efficient optical switch, which is capable of operating between different reflective positions in less than 20 $\mu$s, permitting at least two sets of optical data to be read sequentially by the image sensor. By concatenating the two sets of optical data, a complete image is formed. By splitting the complete image into two or more data sets, it is possible to read the data sets sequentially and hence a smaller image sensor is required. The Digital Micromirror Device has advantages over their larger counterparts. A non-semiconductor chip based driven mechanical mirror requires a high degree of mechanical tolerance to be placed in reproducible orientations in its driven mode. Also, such a mirror is commonly fragile. In contrast to a driven non-semiconductor chip mechanical mirror, the Digital Micromirror Device is robust and capable of being oriented in a reproducible fashion in its driven mode.

Figure 1:
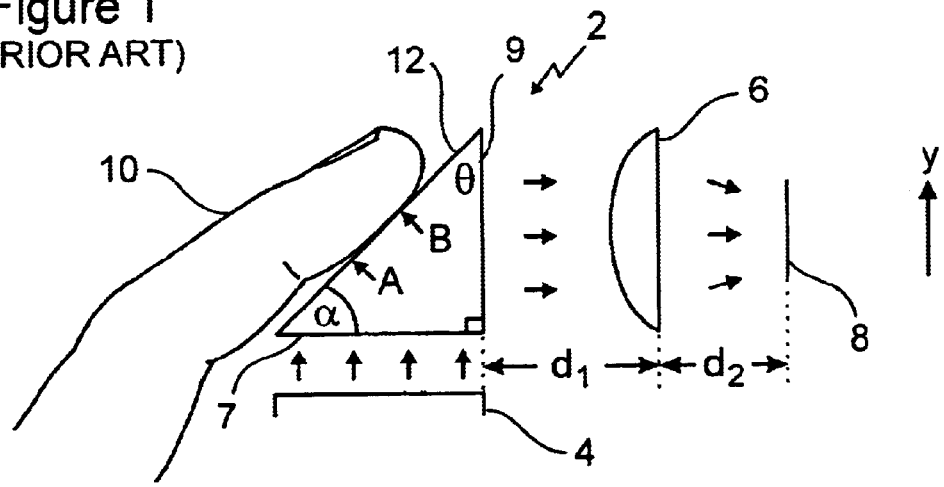
FIG. 1 is a side view of a prior art apparatus for imaging fingerprints.

Referring to FIG. 1, shown is a side view of a prior art optical fingerprint-imaging device. The optical fingerprint-imaging device comprises a platen body in the form of a prism 2; a light source 4; a lens 6; and an image sensor 8. The size of the prism is consistent with the size of a typical human fingertip. An amplifying circuit, not shown, is also part of the device. In operation, a finger 10 is placed on a platen 12, which is an interrogating surface forming part of the prism 2. The light source 4 launches interrogating light into an input port 7 of the prism 2. The interrogating light is incident on and reflected from the platen 12. Portions of the finger 10 touching the platen 12 change the reflective properties of the platen 12. Interrogating light reflected by the platen emerges from an output port 9 of the prism 2 and the lens 6 focuses the emerging light onto the image sensor 8. The image sensor 8 is typically a charge coupled device (CCD) array.

Figure 2A:
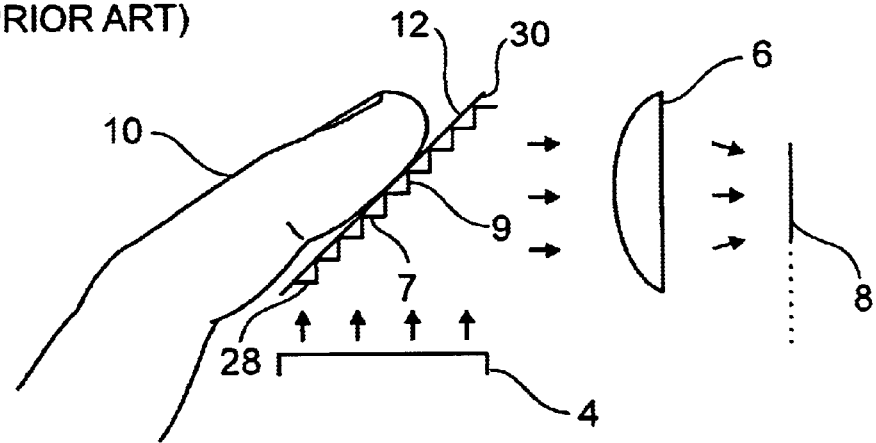
FIG. 2a is a side view of a prior art apparatus for imaging fingerprints using a multi-prism.
Figure 2B:
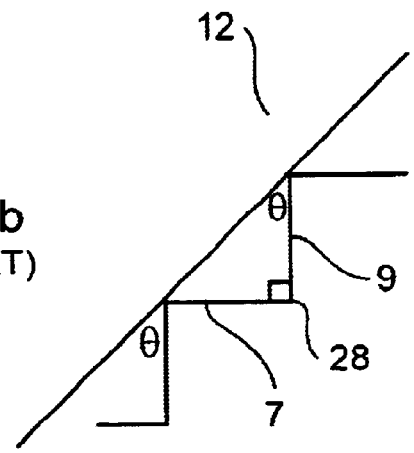

Referring to FIG. 2a, shown is a side view of another prior art optical fingerprint-imaging device in which a conventional prism is replaced by a multi-prism 30 having a platen 12. The staircase-shaped multi-prism 30 is a plurality of small prisms 28 secured to a common backing. Alternatively, the multi-prism 30 is formed of a single piece of material in the desired shape. In operation, a finger 10 is placed on the platen 12, which is an interrogating surface of the multi-prism 30. The light source 4 launches interrogating light into input ports 7 of the prisms 28 forming part of the multi-prism 30. The interrogating light is incident on and reflected by the platen 12. Portions of the finger touching the platen 12 change the reflective properties of the platen 12. Interrogating light reflected by the platen emerges from output ports 9 of the prisms 28 forming part of the multi-prism 30 and the lens 6 focuses the emerging light onto an image sensor 8. Referring to FIG. 2b, shown is a side view of a magnified portion of the staircase-shaped multi-prism 30 of FIG. 2a.

Figure 3:
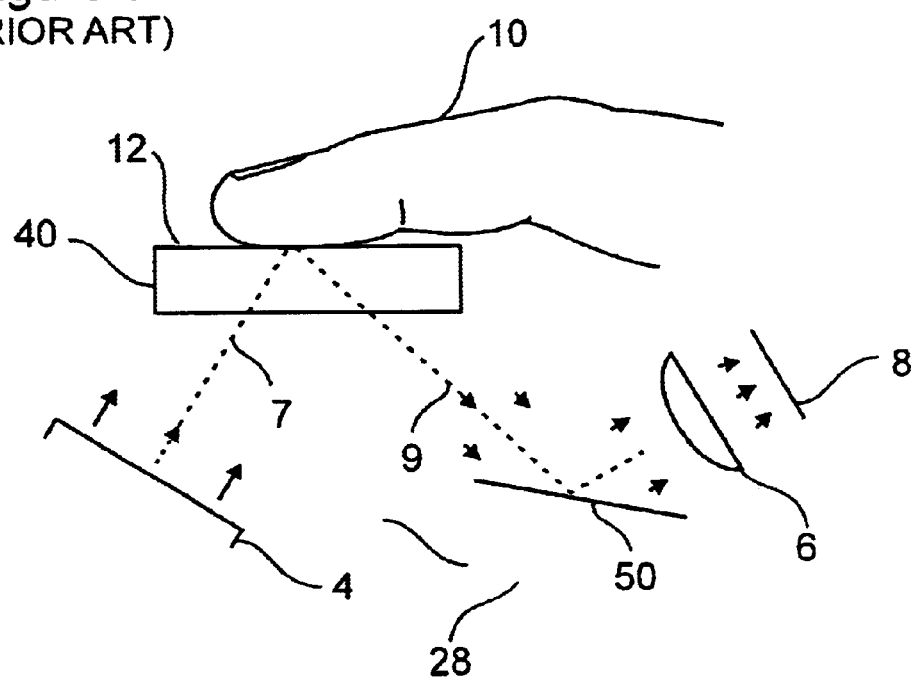
FIG. 3 is a side view of a prior art apparatus for imaging fingerprints.

Referring to FIG. 3, shown is a side view of a prior art optical fingerprint-imaging device. The optical fingerprint-imaging device comprises a platen body in the form of a block 40; a light source 4; a lens 6; a mirror 50; and an image sensor 8. In operation, a finger 10 is placed on the platen 12, which is an interrogating surface of the block 40 and is wide enough to accommodate a fingertip. The light source 4 launches interrogating light into input port 7 of the block 40. The interrogating light is incident on and reflected by the platen 12. Portions of the finger 10 touching the platen 12 change the reflective properties of the platen 12. Interrogating light reflected by the platen emerges from output port 9 of the block, which forms part of a same face of the block 40 as input port 7. Light emerging from the output port 9 is incident on and reflected by the mirror 50 such that the reflected light passes through the lens 6, which focuses the light onto the image sensor 8. The mirror 50 is static, and it has now been found that substitution of the mirror with a Digital Micromirror Device permits reduction in the area of the image sensor 8.

As will be apparent to one skilled in the art the specific geometry of the optical imager is not at the essence the invention. What is commonly required is that: (i) an interrogating beam of light is incident on a platen surface and portion of the light reflected therefrom; (ii) the reflected light is subsequently incident on a micromirror array, the micromirrors within the array operable from a first reflective position to a second reflective position; and (iii) light reflected by the micromirrors in each of the first and second reflective positions is incident on an image sensor. As one skilled in the art will appreciate upon reading the present disclosure, the greater the amount of discreet reflective positions provided by the micromirror the smaller a required image sensor. Obviously as one skilled in the art will appreciate the limiting size of the image sensor is a 1×n array of sensor elements. It is within the scope of the present invention for the platen or any of the optical surfaces to be contoured. In addition, for the prism or block to be substituted by any suitably shaped medium having a platen is within the scope of the present invention. Of course when a micromirror device operable in a plurality of reflective positions and adjustable to vary an angle of the micromirror along two separate axes is used, the limiting size of the image sensor is reduced further to a single 1×1 image sensor. Further, the present invention is applicable to scanners in general. When used with general scanners, a platen for reflecting the light is not always necessary. Also, it is not beyond the scope of the invention to provide a fingerprint scanner absent a platen for scanning a fingerprint image, even though currently, such an optical scanner is considered unreliable.

Presently, the primary uses for Digital Micromirror Devices are in digital displays and the like, for example, projection displays, video and graphics monitors, and televisions as disclosed in U.S. Pat. No. 5,535,047. U.S. Pat. No. 5,535,047 issued Jul. 9, 1996 to Larry J. Hornbeck entitled "Active Yoke Hidden Hinge Digital Micromirror Device" discloses a new generation of Digital Micromirror Devices the teachings of which and references therein are herein incorporated by reference. A Digital Micromirror Device is a micromechanical silicon chip device that is capable of maintaining at least two different reflective positions. A typical size of an individual micromirror is, for example, approximately 15 $\mu$m square, and is made of a highly reflective aluminum alloy. In practice, a Digital Micromirror Device is composed of many micromirrors on a surface; for example a standard access memory (SRAM) chip with an array of 508,000 (848×600) hinged microscopic mirrors has been manufactured by Texas Instruments. Until now the primary utility for a Digital Micromirror Device has been in projectors etc. Each microscopic mirror corresponds to a single pixel in a projected image. Different light is reflected by the micromirrors and the relative amount of time each mirror is in the "on" or "off" position when red, blue or green light shines on it determines the hue and shade of the pixel it generates. A projector incorporating micromirrors operates by reflecting light rays from an external source into the pupil of an imaging lens, which then projects the digitized image onto a screen. Each micromirror is suspended over an air gap by two thin, torsion hinges supported by posts that are electrically connected to an underlying bus. This bus interconnects all the mirrors directly to a base. Underlying the mirror is a pair of address electrodes that are connected to the complementary sides of an underlying static random access memory (SRAM) cell. The micromirrors are arranged in a x-y array, and the chip contains row drivers, column drivers and timing circuitry. The addressing circuitry under each mirror-pixel—is a memory cell (a CMOS SRAM) that drives two electrodes under the mirror with complementary voltages. The electrodes are arrayed on opposite sides of the rotational axis that runs through the torsion hinge attachments. The mirror is held at ground potential through an electrical connection provided by the support pillars and the torsion bar attachments.

The Digital Micromirror Device is mass-produced in standard semiconductor wafer-fabrication facilities—using standard processes and materials. The Digital Micromirror Device is far more cost-effective than alternative devices produced using non-semiconductor technologies or exotic materials. Long term, the semiconductor industry's drive to refine fabrication processes indicates that the Digital Micromirror Device will become increasingly cost-effective and ubiquitous.

As detailed above the Digital Micromirror Devices are presently digital. That is the array of micromirrors is only driven to discreet angles. However, the Digital Micromirror Devices art is a rapidly moving field of investigation and it is postulated that within the near future Digital Micromirror Devices will support many discreet angles and analogue Digital Micromirror Devices likely will become available. The analogue Digital Micromirror Devices will have an array of micromirrors capable of being driven smoothly from one angle to another.

From the forgoing, it will be evident that a number of discreet reflective positions accessible by a Digital Micromirror Devices incorporated into an optical imaging device provides a device in which it is possible to reduce image sensor area. The reduction of image sensor area over an equivalent non-micromirror optical imaging device is proportional to the number of discreet reflective positions accessible by the Digital Micromirror Device.

Figure 4A:
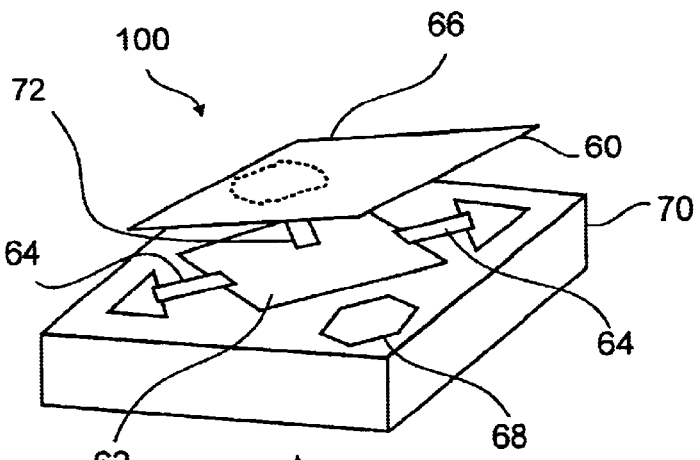
FIG. 4a is a perspective view of a prior art Digital Micromirror Device in a first reflective position.
Figure 4B:
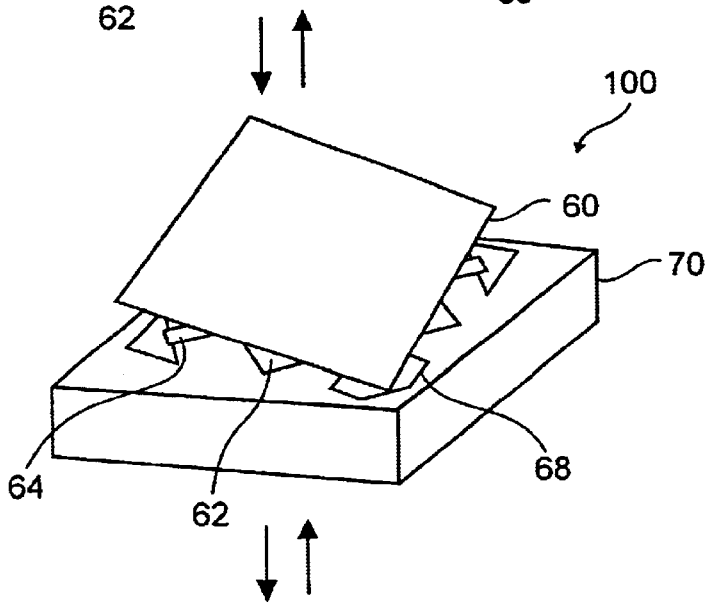
FIG. 4b is a perspective view of the prior art Digital Micromirror Device of FIG. 4a in a second reflective position.
Figure 4C:
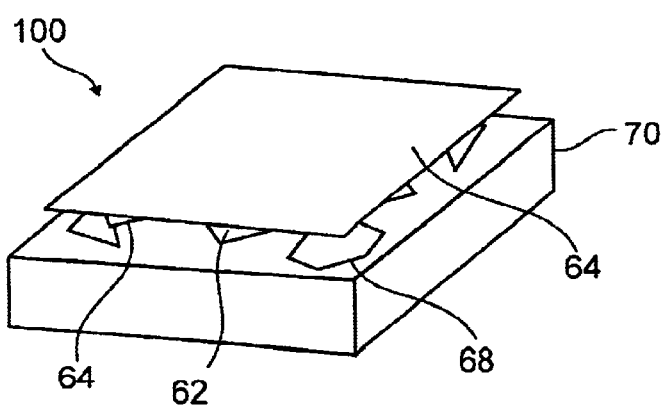
FIG. 4c is a perspective view of the prior art Digital Micromirror Device of FIG. 4a in a third reflective position.

Referring to FIG. 4a, shown is perspective view of a Digital Micromirror Device 100, for clarity a single micromirror is exemplified. The Digital Micromirror Device 100 comprises a mirror 60; a yoke 62; torsion hinges 64; a first address electrode 66; a second address electrode 68; and a base 70. The mirror 60 is pivotally attached to the yoke 70 via a stem 72. Addressing circuitry of the Digital Micromirror Device 100 is not shown. The yoke 70 is pivotally connected to the base 70 via torsion hinges 64. The Digital Micromirror Device 100 is capable of maintaining a first reflective position, and a second reflective position; the Digital Micromirror Device 100 is bistable. The first reflective position is maintained by actuating the first address electrode 66, shown in phantom, such that an electrostatic torque is induced about the torsion hinges 64. The electrostatic force is sufficient to overcome the torsion of the torsion hinges 64 and rotate the mirror 60 into the first reflective position. In the first reflective position, the micromirror subtends an angle of approximately 10° to the base 70. Referring to FIG. 4b, the second reflective position is maintained by actuating the second address electrode 68, such that an electrostatic torque is induced about the torsion hinges 64. The electrostatic force is sufficient to overcome the torsion of the torsion hinges 64 and rotate the mirror 60 into the second reflective position. In the second reflective position, the micromirror subtends an angle of approximately minus 10° to the base 70. As stated above Digital Micromirror Devices are primarily considered "bistable" and their predominant utility is in digital displays in which only an "on" or an "off" position is required. However, it is possible for a Micromirror to support more than two discreet reflective positions. Referring to FIG. 4c, a third reflective position is maintained by maintaining both the first address electrode 66 and the second address electrode 68 in their passive state, i.e., no electrostatic force. In the third reflective position, torque of the torsion hinges 64 maintains the mirror 60 in a position parallel with the base 70. The third reflective position is approximately a 0° offset from the horizontal. Obviously, by changing the geometry of the Digital Micromirror Device 100 it is possible to vary the angle subtended between the different reflective positions.

In the following description of micromirror optical imagers, other optical components such as lenses and controlling circuitry have been omitted from the figures for the sake of clarity and ease of discussion. In addition, the angle that light emerges from an output port 8 is not at the essence of the invention. In some optical imagers, for example, as shown in FIG. 1 and FIG. 2a light emerges substantially orthogonal to the output port 8 or as shown in FIG. 3 non-orthogonal to the output port 8.

Figure 5A:
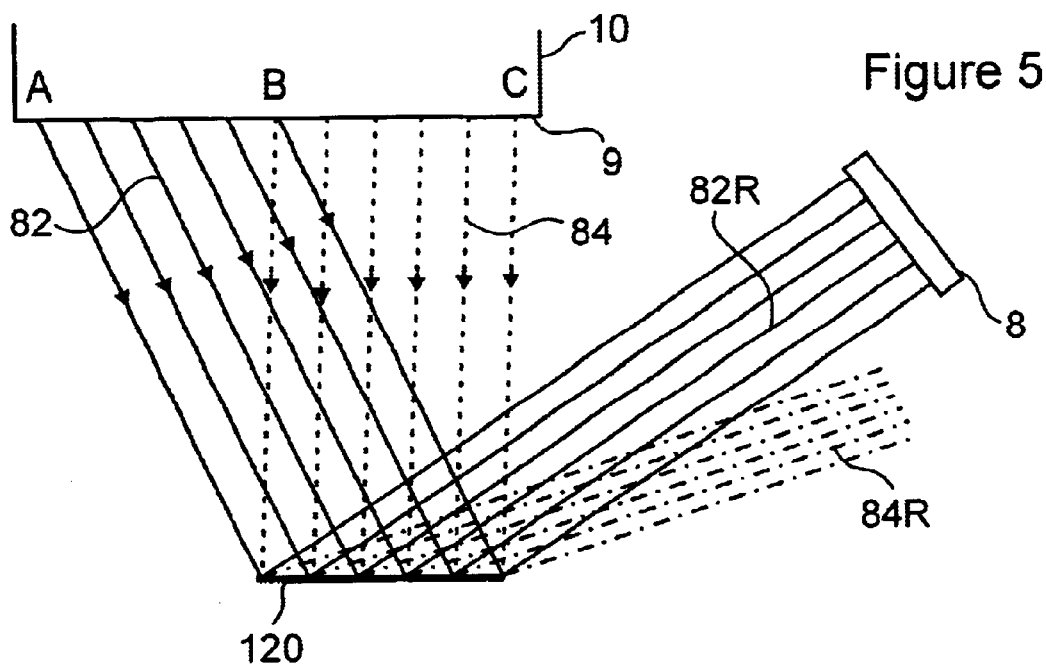
FIG. 5a is a side view of a bistable micromirror optical contact imager.

Referring to FIG. 5a, shown is a side view of a portion of an optical imager comprising: an output port 9 of a platen body 110, an array of bistable micromirrors 120, and an image sensor 8, in which light is shown emerging from the output port 9 of the platen body 110. The light is shown as parallel beams. It is evident to those of skill in the art that a lens (not shown) is a simple component for focusing the light onto the imager 8. The light emerging from the output port 9 is the result of a similar process as described with respect to FIG. 3. The light is incident on the array of bistable micromirrors 120 subtending an angle $\theta_1$ to its base 70; the base 70 is not shown. A first portion of light 82 emerging between point A and point B from the output port 9 is incident on and reflected by the array of bistable, $\theta_1$, micromirrors 120 such that the reflected light 82R strikes the image sensor 8. The image sensor 8 captures an image comprising an array of pixels. A second portion of light 84 emerging between point B and point C from the output port 9 is incident on and reflected by the array of bistable, $\theta_1$, micromirrors 120 such that the reflected light 84R does not strike the image sensor 8. The first portion of light 82 and the second portion of light 84 transmit a first data set and a second data set representative of different portions of a biometric surface touching a platen, not shown, of the platen body 110. The image sensor 8 converts the first portion of light into electrical signals that are stored in a processor's memory as a first stored data set. As will be evident to one skilled in the art the components of the optical imager are held within a housing. In order to reduce internal reflection within the housing it is preferred that light reflected from the array of micromirrors 120 that is not incident on the image sensor 8 is incident on a light absorbing material. Prevention of internal reflections within the housing reduces background noise from the image detector 8.

It is also noteworthy that since each micromirror within the array of micromirrors subtends a same angle, the circuitry to store micromirror orientation and to drive the micromirrors is simplified. For example, for an array of 100 micromirrors, only a single orientation value is necessary and all micromirrors are capable of being oriented by a same drive signal pair. When multistable micromirrors are used, a single set of drive signals simplifies integrated circuit layout and design further.

Figure 5B:
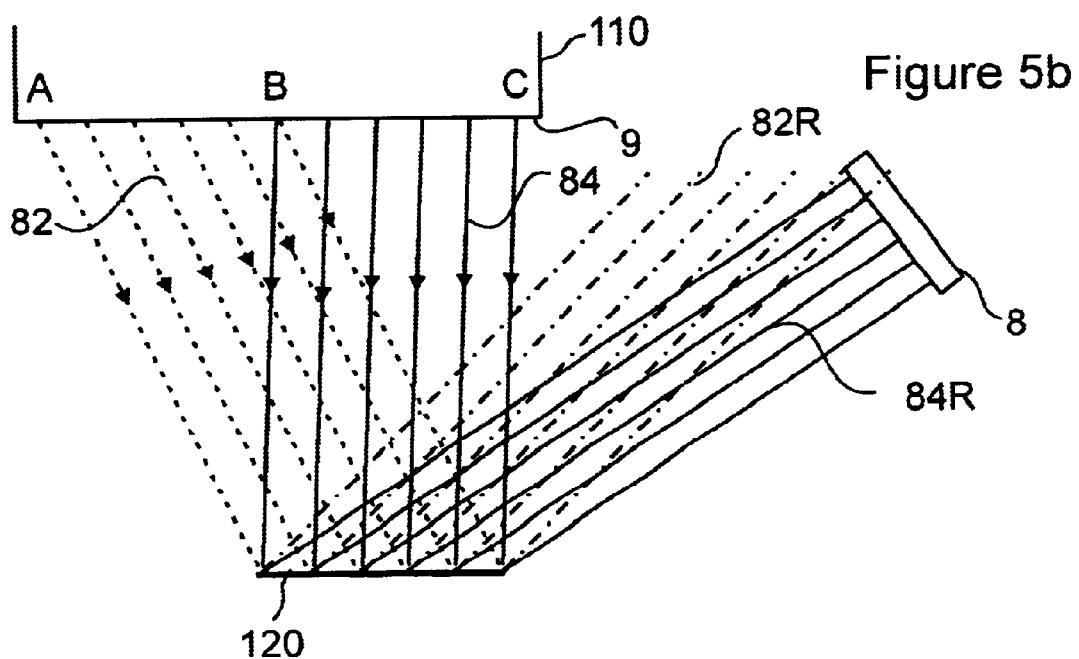
FIG. 5b is another side view of a bistable micromirror optical contact imager.

Referring to FIG. 5b, the array of bistable micromirrors 120 subtending an angle $\theta_1$ as described in FIG. 5a is actuated by a second other control signal such that the array of bistable micromirrors 120 is driven to a second reflective position in which the array of bistable micromirrors 120 subtend an angle $\theta_2$ to its base 70. The second portion of light 84 emerging between point B and point C from the output port 9 is incident on and reflected by the array of bistable, $\theta_2$, micromirrors 120 such that the reflected light 84R strikes the image sensor 8. The first portion 82 of light emerging from the output port 9 between point A and point B is incident on and reflected by the array of bistable, $\theta_2$, micromirrors 120 such that the reflected light 82R does not strike the image sensor 8. The image sensor 8 converts the second portion of light into electrical signals that are stored in memory as a second stored data set. A processor correlates the first stored data set and the second stored data set and constructs a composite data image. In one embodiment, the first data set and the second data set have a substantially congruent portion, which aids recognition and construction of a composite image. In another embodiment concatenating the image portions results in the composite image absent any processing. As will be evident to one skilled in the art, from the discussion of FIG. 5a and 5b above the presence of the array of bistable micromirrors 120 allows the optical imager to function with a reduced image sensor area.

As one skilled in the art will appreciate by switching the array of bistable micromirrors 120 between different reflective positions, a first optical path and a second optical path are provided between the platen and the imager. An array of tristable micromirrors provides three different optical paths. The optical imager of the present invention uses a processor for switching between different optical paths.

Figure 6A:
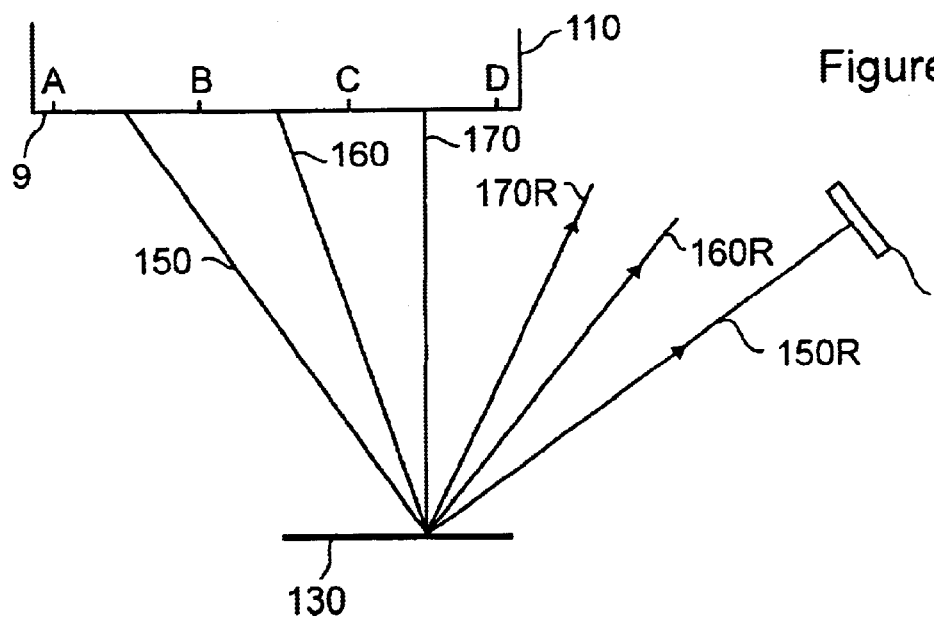
FIG. 6a is a side view of a tristable micromirror optical contact imager.
Figure 6B:
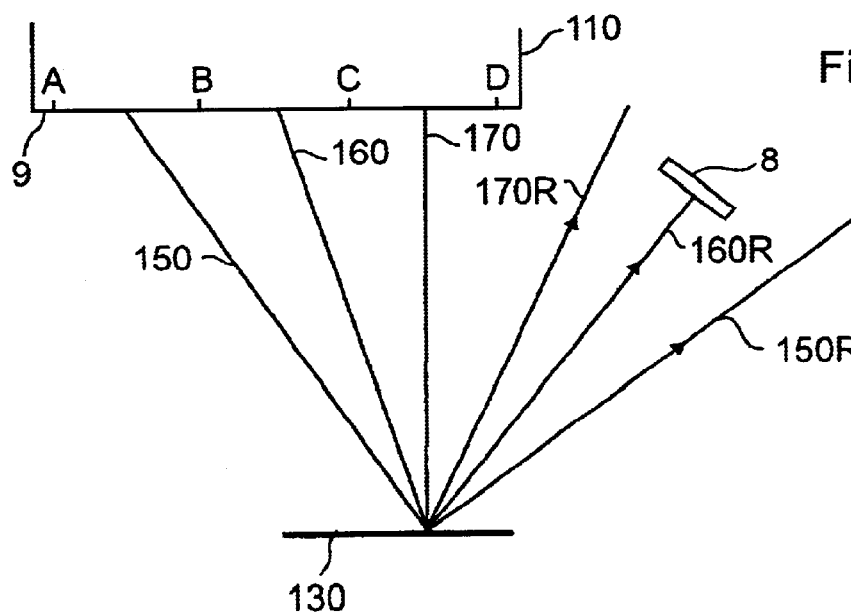
FIG. 6b is another side view of a tristable micromirror optical contact imager.
Figure 6C:
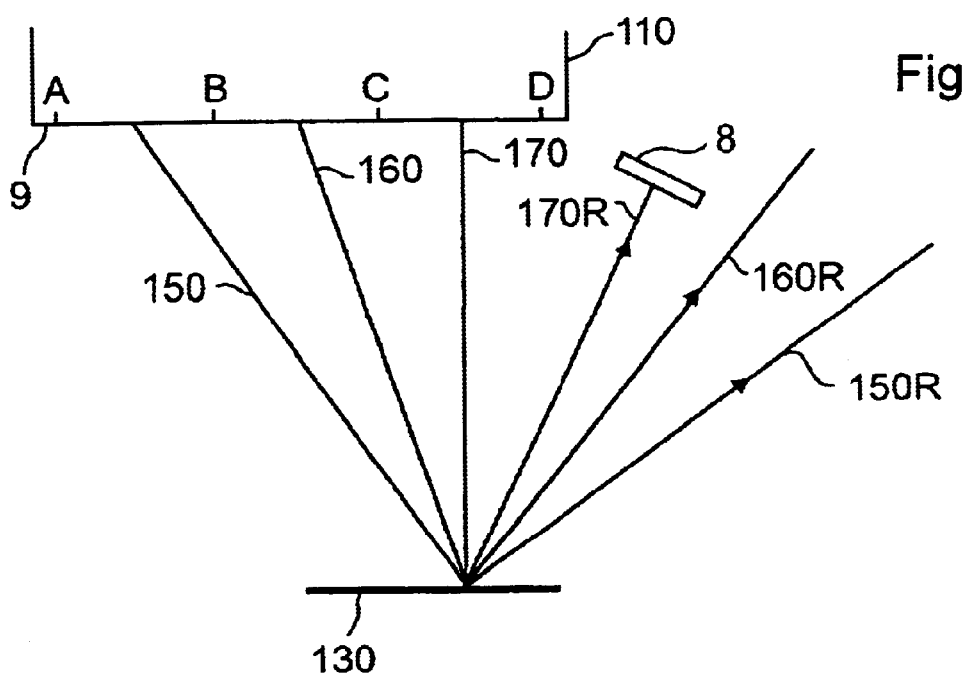
FIG. 6c is another side view of a tristable micromirror optical contact imager; and, FIG. 7 is a simplified flow diagram of a method of imaging a biometric surface according to the present invention.

Referring to FIG. 6a, FIG. 6b and FIG. 6c, shown are side views of a portion of an optical imager comprising an output port 9 of a platen body 110, an array of tristable micromirrors 130, and an image sensor 8, in which light is emerging from the output port 9 of the platen body 110. The optical imager functions in a similar manner as described with reference to FIG. 5a and 5b except that the array of tristable micromirrors 130 is operable between: a first reflective position $\theta_1$; a second reflective position $\theta_2$; and a third reflective position $\theta_3$. The designations, $\theta_1, \theta_2,$ and, $\theta_3$ under the array of tristable micromirrors 130 designate three different global reflective positions of the array of tristable micromirrors 130. For illustrative clarity, a single arrow is used to indicate differing portions of light emerging from the output port 9.

Referring to again to FIG. 6a, in operation, a first portion of light 150 emerging between point A and point B from the output port 9 is incident on and reflected by the array of tristable, $\theta_1$, micromirrors 130 such that the reflected light 150R strikes the image sensor 8. A second portion of light 160 emerging between point B and point C, and third portion of light 170 emerging between point C and point D from the output port 9 are incident on and reflected by the array of tristable, $\theta_1$, micromirrors such that the reflected light 160R and 170R are not incident on the image sensor 8.

The array of tristable micromirrors 130, is actuated by a control signal such that the array of bistable micromirrors 120 is driven to subtend an angle $\theta_2$ to its base 70, not shown. Referring to FIG. 6b, the second portion of light 160 emerging between point B and point C from the output port 9 is incident on and reflected by the array of tristable, $\theta_2$, micromirrors 130 such that the reflected light 160R is incident on the image sensor 8. The first portion of light 150 emerging between point A and point B and the third portion of light 170 emerging between point C and point D from the output port 9 are incident on and reflected by the array of tristable, $\theta_2$, micromirrors such that the reflected light 150R and 170R are not incident on the image sensor 8.

The array of tristable, $\theta_2$, micromirrors 130, is actuated by a control signal such that the array of bistable micromirrors 120 is driven to subtend an angle $\theta_3$ to its base 70. Referring to again to FIG. 6c, the third portion of light 170 emerging between point C and point D from the output port 9 is incident on and reflected by the array of tristable, $\theta_3$, micromirrors 130 such that the reflected light 170R is incident on the image sensor 8. The first portion of light 150 emerging between point A and point B and the second portion of light 160 emerging between point B and point C from the output port 9 are incident on and reflected by the array of tristable, $\theta_3$, micromirrors such that the reflected light 150R and 160R are not incident on the image sensor 8.

The first portion of light 150, the second portion of light 160 and the third portion of light 170 when imaged form a first data set, a second data set and a third data set representative of different portions of a biometric surface touching the platen of the platen body 110. The image sensor 8 converts the light from the first portion into electrical signals, an electronic representation of a captured image comprising an array of pixels, that are stored in memory as a first stored data set. Similarly a second data set and a third data set are stored. In one embodiment, the first data set, the second data set, and the third data set have a substantially congruent portion, which aids recognition and construction of a composite image. In another embodiment, the data sets are known to be representative of adjacent portions of the platen and, therefore, concatenation of the data sets results in the composite image.

It is preferred that the platen surface is scanned sequentially from a first paten portion to a final platen portion, but it is not essential to do so.

From the description of an optical imaging device having a bistable or a tristable micromirror array it will be apparent to one to one skilled the art how to implement an optical imager having a highly multi-stable Digital Micromirror Device. The highly multi-stable Digital Micromirror Device is a micromirror device that supports at least four discreet reflective positions. As a rough correlation, the image sensor size of a micromirror optical reader corresponds to the image sensor size of a non-micromirror optical imager divided by the number of discreet reflective positions supported by the micromirror. As stated above the limiting size of the image sensor for micromirror devices pivotable about a single line is a 1×n array of sensor elements.

It is anticipated that in the future it will be possible to manufacture a Digital Micromirror Device which is capable of supporting: five discreet reflective positions, six seven discreet reflective positions, etc. As one skilled in the art will appreciate, an analogue Digital Micromirror Device provides an infinite number of discreet reflective positions. The analogue Digital Micromirror Device capable of defining an infinite number of discreet reflective positions in practice is driven between a predetermined number of discreet reflective positions required for scanning a whole platen.

It is also within the scope of the present invention to use an image sensor consistent with the size of prior art imaging devices. By using a prior art image sensor having current state of the art to capture an image of a platen portion, a composite image concatenated from a plurality of images provides an image with higher resolution than captured with the image sensor alone. The prior art optical imager uses the whole area of the image sensor to image a complete platen in a single imaging step. In contrast, a high-resolution optical imager of the present invention uses the whole area of the image sensor to image portions of the platen in a plurality of imaging steps. In this manner, a high density of sensor elements is used to scan an area of a platen. Using a greater number of sensor elements to image a whole platen provides for the high-resolution image by concatenation over that of imaging the platen as a whole in a single step.

Further, interleaving of imaged areas of the platen is possible thereby effectively enhancing resolution of a same image area using micromirrors according to the invention. This is highly advantageous in imaging of fingerprint data wherein some users are children. It is well known and evident that biometric data such as fingerprints of children are smaller than fingerprints of adults. Therefore capturing these images at higher resolution is advantageous. Optionally, for adult fingerprints or fingerprints exceeding a predetermined area, resolution enhancement is not employed.

As is evident to one skilled in the art, it is possible to manufacture different qualities of Digital Micromirror Devices. The different qualities the of Digital Micromirror Device ranging from a lower end market Digital Micromirror Device, forming a cheap device, to a high end market Digital Micromirror Device, forming an expensive device. The number of times the Digital Micromirror Device is switched between discreet reflective states that determines the lifetime of the Digital Micromirror Device. Hence, reducing the number of times the Digital Micromirror Device is switched between one discreet reflective state to another will increase the lifetime of a Digital Micromirror Device component in an optical imager of the present invention.

U.S. Pat. No. 4,872,203, issued to Asai, et al. on Oct. 3, 1989, entitled "Image Input Device For Processing A Fingerprint Prior To Identification," herein incorporated by reference, discloses a method of recognizing a distinct pattern. By carrying out a preliminary identification of a partial image on a platen prior to scanning the whole platen. It is possible for the optical imager of the present invention to be kept in a dormant state. In the dormant state, an array of micromirrors are maintained in a single reflective position. Upon detecting the presence of a biometric surface against the platen the optical imager becomes active and scans the whole platen or a sufficient portion thereof for imaging purposes.

Only actuating the micromirrors in the presence of a biometric surface reduces the number of times the Digital Micromirror Device is switched between discreet reflective positions. Analysis of a first image portion on the platen with a processor determines if a pattern is detected indicative of biometric information. If the pattern detected is indicative of biometric information scanning of the complete platen is initiated. Detection of the presence of a fingertip is determined by the following steps: a) providing an electronic representation of a captured image comprising an array of pixels, the array of pixels representative of a portion less than the whole of the platen; b) selecting a predetermined subset of pixels less than all of the pixels in the array of pixels representing the image, each pixel having a predetermined location; c) analysing, with a processor, the subset of pixels to detect a pattern indicative of biometric information within the captured image; and, d) in dependence upon the analysis determining whether or not to scan the biometric surface with the micromirrors forming other optical paths.

By only actuating the micromirrors in the presence of a first image indicative of a biometric surface an energy saving is provided. The optical imager of the present invention sits in its passive state which minimises energy consumption, and upon a fingerprint being place upon the platen the optical imager recognizes that a biometric surface has been placed on the image sensor and the image sensor becomes active. In the active state, the optical imager scans the platen. After imaging a biometric surface, the optical imaging device returns to its passive state—dormant mode.

As is evident to one skilled in the art of computing, there is a limit to the rate that at which data, in the form of a plurality of data sets, is commonly downloaded from an image sensor to a single communications port (COM port) of a computer. When an imager providing approximately 200×300 pixels of resolution is used, the data transfer takes approximately 0.2 seconds. So, accordingly, 0.6 seconds is required to transfer three data sets. When the time required exceeds a threshold, the data sets are captured more rapidly and stored in buffer memory pending transfer. The threshold is determined, for example, based on a length of time during which a biometric surface commonly remains stable on the platen. In a preferred embodiment, downloading the plurality of data sets to a COM port via a buffer overcomes problems associated with using an optical reader of the present invention when interfaced with a single COM port.

The buffer is a data area shared by hardware devices or program processes that operate at different speeds or with different sets of priorities. The buffer allows each device or process to operate without being held up by the other. The buffer allows a plurality of scans from different areas from the platen to be buffered and sequentially fed to the COM port. Use of the buffer prevents the COM port download speed limiting the scanning process, i.e., holding up the process of scanning different platen areas. Alternatively, instead of data being transmitted to a processor in series the data is transmitted to a processor in parallel, this allows a greater amount of data to be downloaded into a computer.

The present invention also extends to a method of optically imaging a biological surface disposed on a platen using an imaging device of the present invention. From the aforementioned description, many of the steps will be evident. The construction of a fingerprint from individual data sets requires the use of a processor. Alternatively, the biometric image is constructed by concatenating data sets absent processing. Each individual data set requires an image space and the micromirrors are driven from one reflective position to another. In essence, the method comprises the following steps: acquisition of a first partial image of a biological surface disposed on a platen from a reflected image from an array of micromirrors forming a first optical path, in which the array of micromirrors defines a first reflective position; driving the micromirrors from the first reflective position such that they define a second reflective position in which the array of micromirrors defines a second optical path; acquisition of a second partial image of the biological surface disposed on the platen from a reflected image from the array of micromirrors forming the second optical path; and, construction of a composite image of the biological surface from the first partial image and the second partial image.

Figure 7:
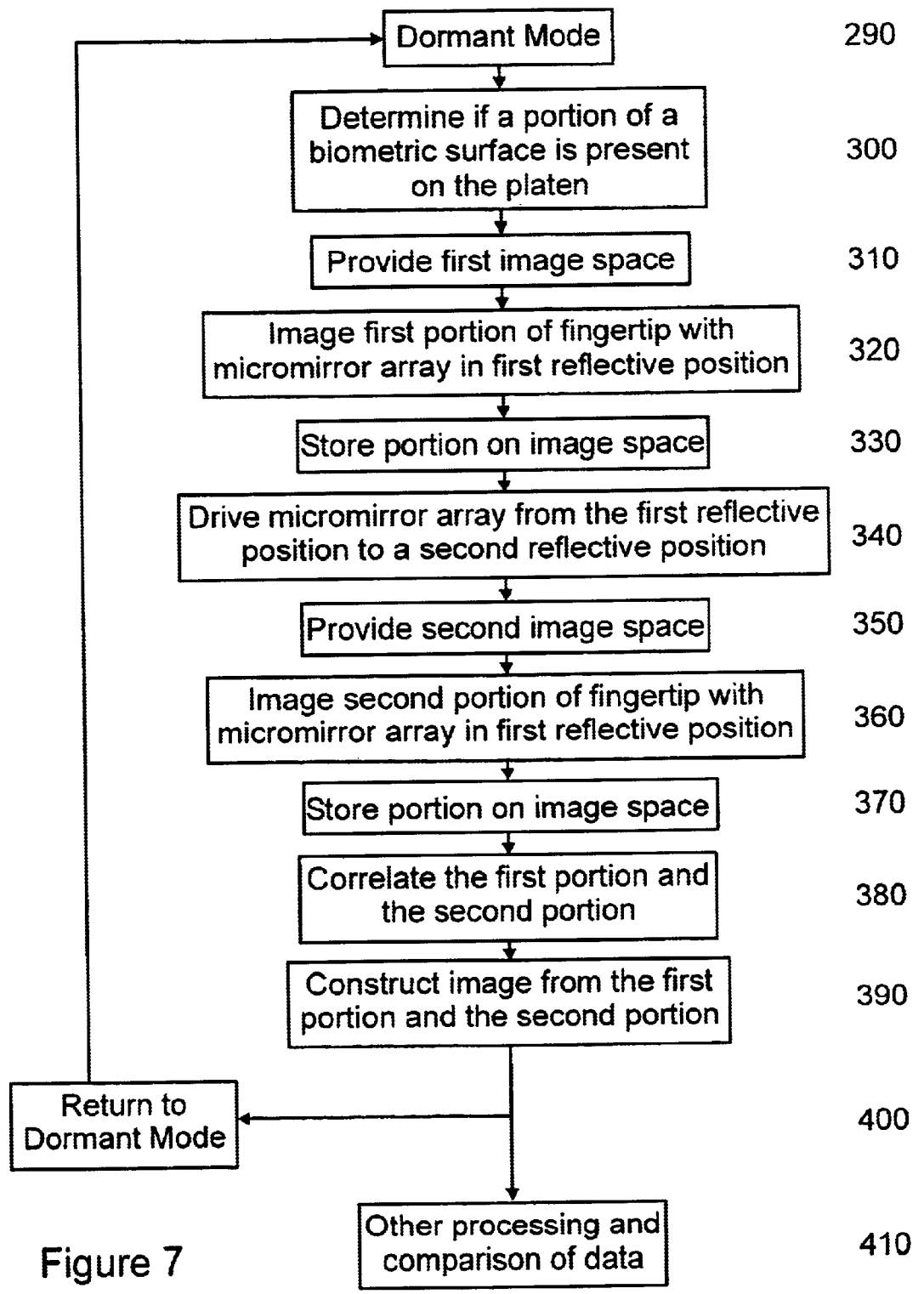

Programming of a processor to control an optical imager of the present invention is a routine matter for one skilled in the art. Referring to FIG. 7, shown is a simplified, non-limiting, flow diagram of a method according to the present invention. From the dormant mode 290, it is determined if a biometric surface is disposed against the platen 300. Then a first image space 310 is provided for an image portion, followed by imaging the portion of a fingertip with a micromirror array in a first reflective position 320. After imaging 330, the imaged portion of a fingertip is stored 320 and the micromirror array driven to a second reflective position 330. A second image space is provided, a second fingertip portion is imaged with micromirror array in the second reflective position 340 and the image is stored 360. The first and second fingertip portions are correlated 370 and a composite image is constructed 380. After the construction of a composite image 390, the optical imager returns to the dormant mode 290 and other processing and comparison of data is initiated 410.

Of course, when the determination is made in a first micromirror orientation corresponding to an image portion, the image used to determine if a biometric surface is on the platen may form part of the composite image, thereby eliminating one image capture operation and speeding up the process from verifying the presence of a biometric surface to complete image capture.

In an alternative embodiment, a Digital Micromirror Device operable in two positions is provided having a very slow switching response. Images are captured during a process of switching the Digital Micromirror Device from a first position to a second position. In order to capture the images, an image sensor having a sufficiently fast capture rate is used. The images are then combined to form a composite image. Many methods are known for forming a composite image from the images captured. A first method uses image analysis to determine overlapping areas within the images. Another method is to use a priori information relating to the Digital Micromirror Device switch timing to allow for accurate placement of images. Yet another method uses a sensed Digital Micromirror Device position associated with each image. Of course, these methods may be combined to improve the quality of the composite image formed by combining the images.

Numerous other embodiments may be envisaged without departing from the spirit and scope of the invention.

What is claimed is:

1. An optical imager comprising:
   a light source for emitting light;
   a platen for reflecting a portion of light emitted by the light source and incident thereon;
   an image sensor for sensing light incident thereon; and,
   a micromirror device operable from a first reflecting position for reflecting a first portion of light reflected from a first location on the platen along a first optical path from the platen to the image sensor to a second other reflecting position for reflecting a second portion of light reflected from a second other location on the platen along a second optical path from the platen to the image sensor.

2. An optical imager according to claim 1, comprising:
   a controller for moving the micromirror device between the first reflecting position and the second reflecting position.

3. An optical imager according to claim 2,
   wherein the micromirror device comprises an array of micromirrors.

4. An optical imager according to claim 3,
   wherein within each of the first optical path and the second optical path is disposed a lens for focusing light onto the imager.

5. An optical imager according to claim 4,
   wherein the image sensor comprises a charge coupled device.

6. An optical imager according to claim 1,
   wherein the micromirror device is operable in a third other reflecting position.

7. An optical imager according to claim 1,
   wherein the micromirror device comprises a multi-stable Digital Micromirror Device.

8. An optical imager according to claim 1, comprising:
   a processor for combining captured image data to form a composite image therefrom.

9. A method of capturing an image comprising the steps of:
   positioning an array of micromirrors in a first reflective position;
   acquiring a first image of light reflected from the array of micromirrors to form an image of a first area;
   positioning the micromirrors in a second other reflective position;
   acquiring a second image of light reflected from the array of micromirrors to form an image of a second area; and,
   combining the first image and the second image to form a composite image of an area larger than the first area and larger than the second area.

10. A method of capturing an image according to claim 9, comprising the steps of:
    positioning an array of micromirrors in a third reflective position; and,
    acquiring a third image of light reflected from the array of micromirrors to form an image of a third area,
    wherein during the step of combining, the third image is combined with the first and second images.

11. A method of capturing an image according to claim 9, comprising the step of:
    correlating portions of the first image and the second image to determine a portion common to the first image and the second image, the determination used in combining the images to form a composite image.

12. A method of imaging a fingerprint according to claim 9, comprising the steps of:
    determining if the first image includes biometric information and providing a result based on the determination; and,
    when the result is indicative of a presence of biometric information performing the step of positioning the micromirrors in the second other reflective position.

13. A method of capturing an image comprising the steps of:
    positioning an array of micromirrors in a first reflective position;
    acquiring a first image of light reflected from the array of micromirrors to form an image of a first area;

moving the micromirrors to a second other reflective position;

during motion of the micromirrors at intervals acquiring a plurality of images of light reflected from the array of micromirrors to form an image of a other areas; and, combining the first image and the plurality of images to form a composite image.

14. A method of capturing an image as defined in claim 13, wherein the step of combining images is performed in dependence upon a known image capture rate relative to a rate of motion of the micromirrors.

15. A method of capturing an image as defined in claim 13, wherein the step of combining images is performed in dependence upon a sensed micromirror position associated with some captured images from the plurality of captured images.

16. A method of capturing an image as defined in claim 13 comprising the step of:

when the micromirrors are in the second other reflective position, capturing a second other image of light reflected from the array of micromirrors to form an image of a second area;

wherein the step of combining images combines images including the second other image.

17. A method of capturing an image as defined in claim 13, wherein the step of combining images is performed in dependence upon known information relating to micromirror motion and image analysis to determine portions of images that overlap.

* * * * *